United States Patent [19]

Tuck

[11] Patent Number: 4,996,129
[45] Date of Patent: Feb. 26, 1991

[54] BATTERY

[75] Inventor: Clive D. S. Tuck, Banbury, England

[73] Assignee: Alcan International Limited, Montreal, Canada

[21] Appl. No.: 291,743

[22] Filed: Dec. 29, 1988

[30] Foreign Application Priority Data

Jan. 5, 1988 [GB] United Kingdom ............... 8800082

[51] Int. Cl.$^5$ ................... H01M 4/04; H01M 10/40
[52] U.S. Cl. ................................... 429/194; 204/2.1
[58] Field of Search ................. 204/2.1; 429/194, 52

[56] References Cited

U.S. PATENT DOCUMENTS

| | | | |
|---|---|---|---|
| 4,116,780 | 9/1978 | Sammells | 204/2.1 |
| 4,126,486 | 11/1978 | Morris et al. | 148/2 |
| 4,126,489 | 11/1978 | Williams | 427/111 |
| 4,483,719 | 11/1984 | Furrer et al. | 148/2 |
| 4,820,599 | 4/1989 | Rurukawa et al. | 429/194 |

FOREIGN PATENT DOCUMENTS

| | | | |
|---|---|---|---|
| 0930019 | 7/1973 | Canada | 204/2.1 |
| 1479429 | 7/1974 | United Kingdom . | |

OTHER PUBLICATIONS

Jasinski, High Energy Batteries, Plenum Press, New York 1967.

Primary Examiner—Donald L. Walton
Attorney, Agent, or Firm—Cooper & Dunham

[57] ABSTRACT

The invention concerns rechargeable lithium batteries and anodes for such batteries and method of making the anodes, and comprises the features: (a) the anode may be of a solution type alloy of commercial purity Al with at least one of Mg, Ga, Ca, Si, Sn, Li, Ge and Zn; (b) alternatively, the anode may be of a wrought eutetic aluminum alloy containing 3–25 volume % of dispersed intermetallic particles of average diameter 0.1 to 2 microns; (c) the anode may have been electrochemically alloyed with Li and pre-treated by being subjected to more than one charge-discharge cycle to improve the initial charge-discharge efficiency of the battery. When used as anodes in rechargeable lithium batteries, the specified alloys show high charge-discharge efficiency. Alloys based on commercial purity Al are easier to cut and shape than are alloys based on super-purity Al.

9 Claims, 6 Drawing Sheets

BATTERY

Rechargeable lithium batteries, comprising a lithium-based anode and an organic electrolyte containing a dissolved lithium salt, are well known. This invention concerns improvements in such batteries, and relates particularly to the anodes and their preparation.

As an anode for such batteries, pure lithium metal is unsatisfactory in a number of ways. Aluminium has been identified as a suitable effective substrate for rechargeable lithium batteries particularly with regard to its ready formation of Al-Li alloys with the lithium electro deposited during recharge, affording a substrate having a higher melting point (680° C.) than lithium metal (180° C.) and having a lower reactivity than does lithium metal with the battery electrolyte. These two factors provide a safer rechargeable battery system when aluminium is used in this way. However, problems arise due to physical changes which disrupt the integrity of the substrate during cycling of the lithium metal in and out of the aluminium.

Japanese Pat. No. 61-66369 and Japanese laid-open patent application no. 62-20246 teach the use of Al alloys in place of pure Al as a substrate for anodes for Li batteries. Alloying metals proposed include indium, gallium, germanium, magnesium, calcium, silicon and tin.

Japanese Pat. Nos. 59-128779 and 59-128780 describe a technique of subjecting anodes of Li (optionally containing a minor proportion of Al) to a preliminary discharge-charge cycle, to cater for a possible volume change prior to incorporation in the battery.

Japanese Pat. No. 61-208750 describes the preparation of an anode for a Li battery by superimposing a Li plate on a work-hardened Al or Al alloy plate and electrolytically alloying the two together. Al alloys taught include those with In, Mg and Zn.

In one aspect this invention provides a rechargeable lithium battery having an anode comprising an alloy of commercial purity Al with at least one of Mg, Ga, Ca, Si, Sn, Li, Ge and Zn, said anode prior to installation in the battery having been electrochemically alloyed with Li and pre-treated by being subjected to more than one charge-discharge cycle to improve the initial charge-discharge efficiency of the battery.

In another aspect the invention provides a rechargeable lithium battery having an anode of a wrought eutectic aluminium alloy containing 3-25 volume % of dispersed intermetallic particles of average diameter 0.1-2 microns.

In yet another aspect the invention provides a method of preparing anodes for rechargeable lithium batteries, which method comprises using a sheet of an Al alloy as defined, electrochemically alloying the sheet with Li, pre-treating the sheet by subjecting it to more than one charge-discharge cycle, and cutting and forming the anodes from the pre-treated sheet.

In order to avoid rapid oxidation, all operations with lithium need to be carried out in an oxygen-free atmosphere. For the preparation of individual anodes for batteries, it is convenient to work on a large sheet of metal, the last stage of preparation being the cutting and forming of individual anodes from this sheet. The sheet is of an Al alloy, and is electrochemically alloyed with Li. The technique of electrochemical alloying involves contacting the metal sheet with a liquid containing Li in chemically combined form, whereby the Li is brought to zero valency and caused to alloy with the metal of the sheet. In one technique, which is generally performed at ambient temperature but which requires an impressed electric current, the liquid is a solution of a Li compound such as $LiClO_4$ or $LiBF_4$ in an organic electrolyte such as propylene carbonate or 1,2-dimethoxyethane. In another technique, performed at elevated temperature but which does not necessarily require an impressed electric current, the liquid is a molten Li salt. In the preparation of anodes for rechargeable batteries, electrochemical alloying is more satisfactory than alloying with pre-formed Li metal sheet.

In order that the battery may have a long service life prior to recharging, electrochemical alloying is continued so as to introduce as much Li as possible into the Al alloy sheet. It is generally possible in this way to make alloy containing up to 50 atomic % or even more of Li. Beyond these levels, excess Li is simply deposited on the surface of the sheet where it may crumble off or become passivated and perform no useful function.

The final preparative step involves making individual anodes by cutting the sheet which has been loaded with Li. When the sheet is of an alloy based on high purity or super purity Al (unintentional impurity content below about 0.2%) the sheet tends to be brittle, so that cutting and forming it without cracking are difficult. According to one aspect of the invention, this problem may be solved by using alloys based on commercial purity Al (unintentional impurities predominantly Fe and Si of at least 0.2% and preferably at least 0.5%). Such alloys are much cheaper than those based on high purity or super purity Al; they are much easier to cut and form without cracking; and their performance as anodes in rechargeable Li batteries is not significantly inferior to, and may on occasions be superior to, alloys based on high purity or super purity Al.

The anodes, and the metal sheet used in their preparation, may be based on an alloy of commercial purity Al with at least one of Mg, Ga, Ca, Si, Sn, Li, Ge, and Zn. The alloying addition is preferably in the range of 0.1% to 10%. Below 0.1%, the effect may be rather slight. Above 10%, the alloys may be difficult to make and form into foil by any economical route. The alloys may be made by adding a molten master alloy to molten Al of the required purity, and casting the mixture. On being subjected to repeated charge-discharge cycles, batteries having anodes based on these alloys show higher efficiency than batteries based on simple Al.

Alternatively, the anode may be of aluminium alloy containing 3-25 volume % of dispersed particles with an average size in the range 0.05-2 microns. Preferably, the particles contain one or more of Fe, Mn, Ni, Si, Ca, Co and Zn. More preferably, the alloy contains Ni alone or two or more of Ni, Fe, Mn, Si and Co in amounts constituting between 20% less and 10% more than the value of a eutectic composition. Preferably the alloy is a wrought eutectic aluminium alloy containing 5-20 volume % of dispersed intermetallic particles in the form of unaligned intermetallic rods having an average diameter in the range 0.1 to 1.5 microns with no more than 2% of coarse primary inter-metallic particles. The term "wrought" is used to indicate that the aluminium alloy has been worked, preferably to effect at least 60% reduction in thickness. The most convenient method for producing wrought-like intermetallic phases in an aluminium mass is to cast a eutectic or near eutectic alloy, incorporating elements which form intermetallic phases with aluminium on solidification, under selected casting conditions to produce so-called "coupled growth". That phenomenon is well known and is explained in an article by J. D. Livingston in "Material Science Engineering" Volume 7 (1971) pages 61–70. The cast alloy is then worked to break up the rods into small dispersed particles.

Alloys of this kind are well known, and are described for example in British patent specification No. 1479429 and in U.S. Pat. Nos. 4,126,487; 4,126,486; and 4,483,719.

Particularly preferred alloys of this kind, containing both Fe and Mn, may be chosen from the 8000 Series of the Aluminium Association Register. These wrought eutetic alloys give rise to advantages in two ways:

On being subjected to repeated charge-discharge cycles, batteries having anodes based on these alloys show particularly high efficiency.

On being charged up prior to incorporation in a battery, these alloys incorporate lithium at a faster rate than pure Al or Al alloys containing dissolved alloying constituents.

When an anode is subjected to repeated charge-discharge cycles, either in or out of a battery, it tends to give anomalous results for the first few cycles. In particular, the efficiency tends to be lower during the first few cycles. After the first few cycles, performance of the anode is more regular and efficiency tends to be higher. It is unsatisfactory that the charge-discharge cycle efficiency of a new battery should be below that achievable later. This problem may be solved according to one aspect of the invention by pre-treating the anode (or the metal sheet from which it is to be cut and formed) prior to introduction into the battery, so as to improve the initial charge-discharge efficiency of the battery. Pre-treatment may be by way of a few charge-discharge cycles. More than one charge-discharge cycle is required for pre-treatment, generally at least three and typically up to five, except in the case of Al-Li alloys where as many as ten cycles may be required to reach high efficiency.

Thus the manufacture of anodes for rechargeable lithium batteries may typically comprise the following steps:

an alloy of the required composition is cast and rolled to a sheet of the required thickness.

The sheet is contacted with a solution of a lithium compound in an organic solvent and pre-treated by means of a series, typically five, of charge-discharge cycles.

The pre-treated sheet is thereafter electrochemically alloyed with Li, in order to introduce as much Li into the sheet as possible.

The pre-treated and electrochemically alloyed sheet is cut, typically into disks, which are formed into the shape of the desired anodes.

Rechargeable lithium batteries are assembled by conventional techniques, using the anodes so formed.

Materials normally used as cathodes in rechargeable lithium batteries may be used in this invention. These are often intercalation compounds. Examples are $TiS_2$, $MoS_2$, $MoS_3$, $FeS_2$, $ZrS_2$, $NbS_2$, $NiPS_3$, and $VSe_2$. $TiS_2$ is particularly suitable as it possesses a lamellar structure and the diffusion constant of Li into it is extremely high.

As electrolytes, organic electrolyte solutions are preferably used in which 1, 2 or more electrolytes such as e.g. $LiClO_4$, $LiPF_6$, $LiBF_4$ or $LiB(C_6H_5)_4$ are dissolved in one or more of the lithium-conductive organic solvents commonly used in this type of cell, e.g. 1, 2-dimethoxyethane, 1, 2-diethoxyethane, propylene carbonate, gamma-butyrolactone, tetrahydrofuran, 2-methyltetrahydrofuran, 1,3-dioxolan and 4-methyl-1,3-dioxolan. Stabilisers such as hexamethylphosphoric triamide may be incorporated into the above organic electrolyte solutions in order to control the decomposition of electrolytes which lack stability, such as $LiPF_6$. Alternatively, molten salt electrolytes containing Li may be used as is well known.

EXPERIMENTAL

Figure 1:
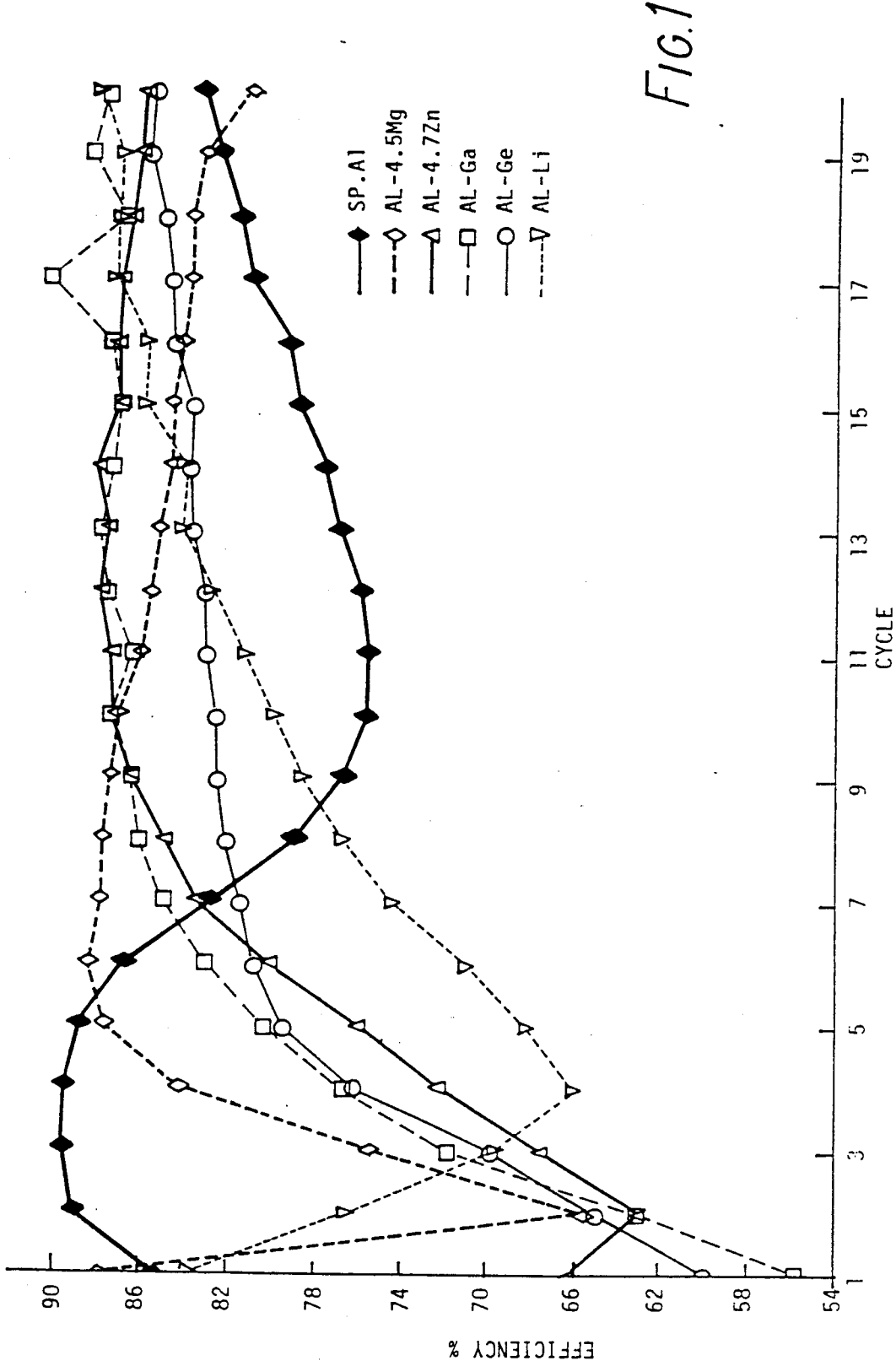
FIG. 1 is a graph of depositing and stripping efficiencies of lithium on several Al-alloys under the following conditions: 1 $mA/cm^2$, 1 coulomb, propylene carbonate/$LiBF_4$.

Example 1 provides background information of foil preparation. Examples 2 and 3 show stripping efficiency of super-pure aluminium and various solution alloys based on super-pure aluminium. Example 4 compares stripping efficiencies of Al-Mg alloys based on super-pure Al and on commercial purity Al and shows that the alloys based on commercial purity Al are at least as good as those based on super-purity Al. This example, taken with Examples 2 and 3, indicates the good stripping efficiency of a range of solution alloys based on commercial purity Al. It will be recalled that these commercial purity alloys are also cheaper and easier to cut and form than are alloys based on super-purity Al.

Example 5 shows the use of wrought eutectic alloys based on Al-Fe-Mn. Example 6 describes preparation of anodes for use in a battery. Example 7 shows stripping efficiencies of various Al alloys, both of the solution and the dispersion type. Example 8 concerns rate of incorporation of Li into Al sheet. Example 9 concerns flexibility of lithiated Al and alloys.

EXAMPLE 1 FOIL PREPARATION

The thin foils of super pure alloys used in the experimental procedure containing either 4.5% Mg, 4.7% Zn, 2.6% Ga, 4.3% Ge, or 2.8% Li were prepared by melting and casting the alloy and then warm rolling to 3 mm thick followed by cold rolling to 0.12 mm thick. Super pure Aluminium foil 0.12 mm thick and alloys in the 5000 and 8000 series in a number of different thicknesses were obtained commercially. Foils used in the as received condition or cold rolled condition were degreased in a solvent before the electrochemical tests were carried out.

To investigate the effects of annealing on the electrochemical performance foils were heated to 350° C. for 1 hour before testing as described in example 2 below. To remove surface films formed during heat treatment the foils were dipped in 30% nitric acid at room temperature and as a further precaution some films were then polished with 0.25 micron diamond paste before testing.

It was found that when foils were annealed in air their electrochemical performance, even after etching or etching and polishing, was inferior to that of the as received or cold rolled material. However, alloys in the 5000 series annealed in a controlled atmosphere and not treated to remove surface films were found to perform in the electrochemical tests in the same way as the cold rolled and not annealed foils. All of the subsequent tests were carried out on material in as received or the cold worked condition.

EXAMPLE 2 STRIPPING EFFICIENCY

A 0.12 mm thick 15 mm diameter disc punched from a sheet of the alloy to be studied was made one electrode of a cell having a lithium counter electrode both electrodes being shielded so that on each only 1 square cm of surface was exposed to the electrolyte. A thin lithium pointer shaped reference electrode was placed with its tip in the 6 mm space separating the cell electrodes. The electrode assembly was immersed in an electrolyte of 1M $LiBF_4$ in commercial purity propylene carbonate.

The alloy disc was first charged with lithium by passing current through the cell at a current density of 1 ma/cm$^2$ until 1 coulomb/cm$^2$ had been passed. The coulombs passed was recorded as the electrode was discharged either at the same current density or at 10% of it until the anode voltage versus the reference electrode rose to +1 volt. Stripping efficiency was calculated as:

stripping efficiency =

$$\frac{\text{coulombs passed during discharge}}{\text{coulombs passed during charging}} \times \frac{100}{1}$$

Each of FIGS. 1 to 6 is a graph of stripping efficiency against charge-discharge cycle.

Variation in stripping efficiency during twenty successive cycles is shown in FIG. 1 for super pure aluminium and each of the super pure alloys tested.

Figure 2:
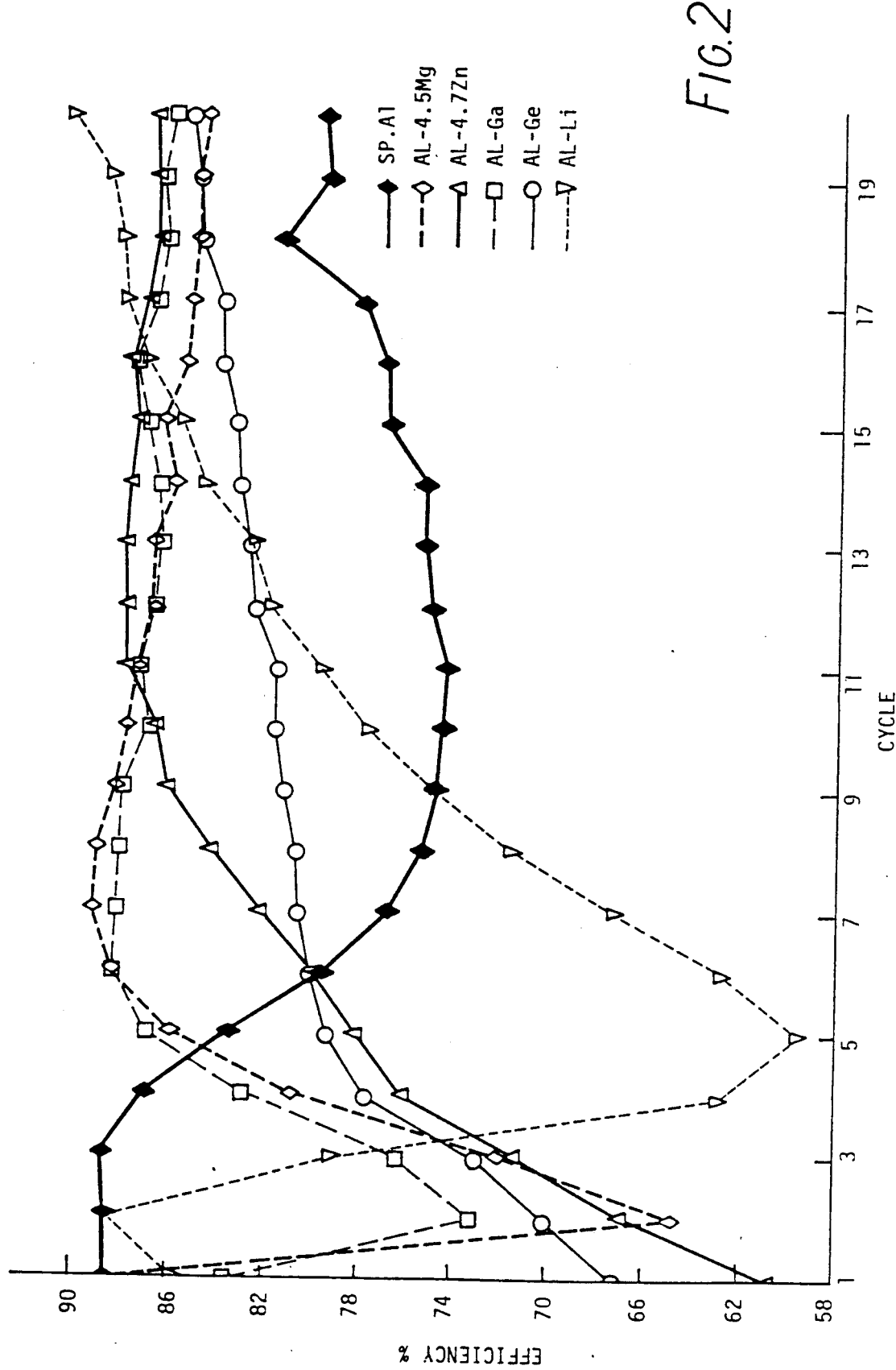
FIG. 2 is a graph of depositing and stripping efficiencies of lithium on the same Al-alloys under the conditions specified above for FIG. 1, but with a 500 second delay between charge and stripping.

The stripping efficiency for aluminium alone begins at a value of around 90% but falls off after about five cycles and remains fairly low after that time. The alloy substrates however, seem to behave in the opposite manner in that they demonstrate a lower efficiency during the initial five cycles than that thereafter. The alloys displaying particularly good performance after that time are AlMg and AlGa, although AlLi displays increasing good performance towards the end of the twenty cycles. The effect of the improved efficiency of the alloys over pure aluminium is even more marked when there is a time delay between the deposition and stripping periods, as shown in FIG. 2. In this case there is a 500 s delay at open circuit introduced between charge and discharge of lithium and an overall improvement of cycling efficiency is shown by the aluminium alloys over and above that of pure aluminium after the fifth cycle.

It should be added that the use of these solid solution alloys at the alloy levels recorded here does not result in a loss of electrode potential greater than that observed for pure aluminium. Thus the voltage realised when these alloys are used as substrates in rechargeable lithium batteries would be comparable to that obtained when pure aluminium was used and their advantage would be their greater lithium cycling efficiency to produce a longer cycle life.

EXAMPLE 3

Electrodes prepared as in EXAMPLE 2 were repeatedly charged at 1 ma/cm$^2$ and discharged at 1 ma/cm$^2$ (1 coulomb charge) for 5 cycles followed by draining the electrolyte from the cell. After a three hour delay the cell was refilled with fresh electrolyte and cycling was recommenced. Results shown in FIG. 3 demonstrate that most of the aluminium alloy anodes, and particularly the Al-Mg, conditioned in this way gave higher efficiencies throughout the further cycles.

The method of measuring the stripping efficiency described in example 2 tends to yield a lower result than would be obtained in a battery. In all of the tests carried out the electrolyte was commercial purity propylene carbonate, whereas batteries make use of a purer electrolyte. The impurities present in the commerical grade propylene carbonate can tend to react with the surface of the anode, often to the detriment of the stripping efficiency. In addition, the pressure applied during assembly of the battery tends to inhibit the growth or formation of dendrites and this helps the battery life.

Figure 3:
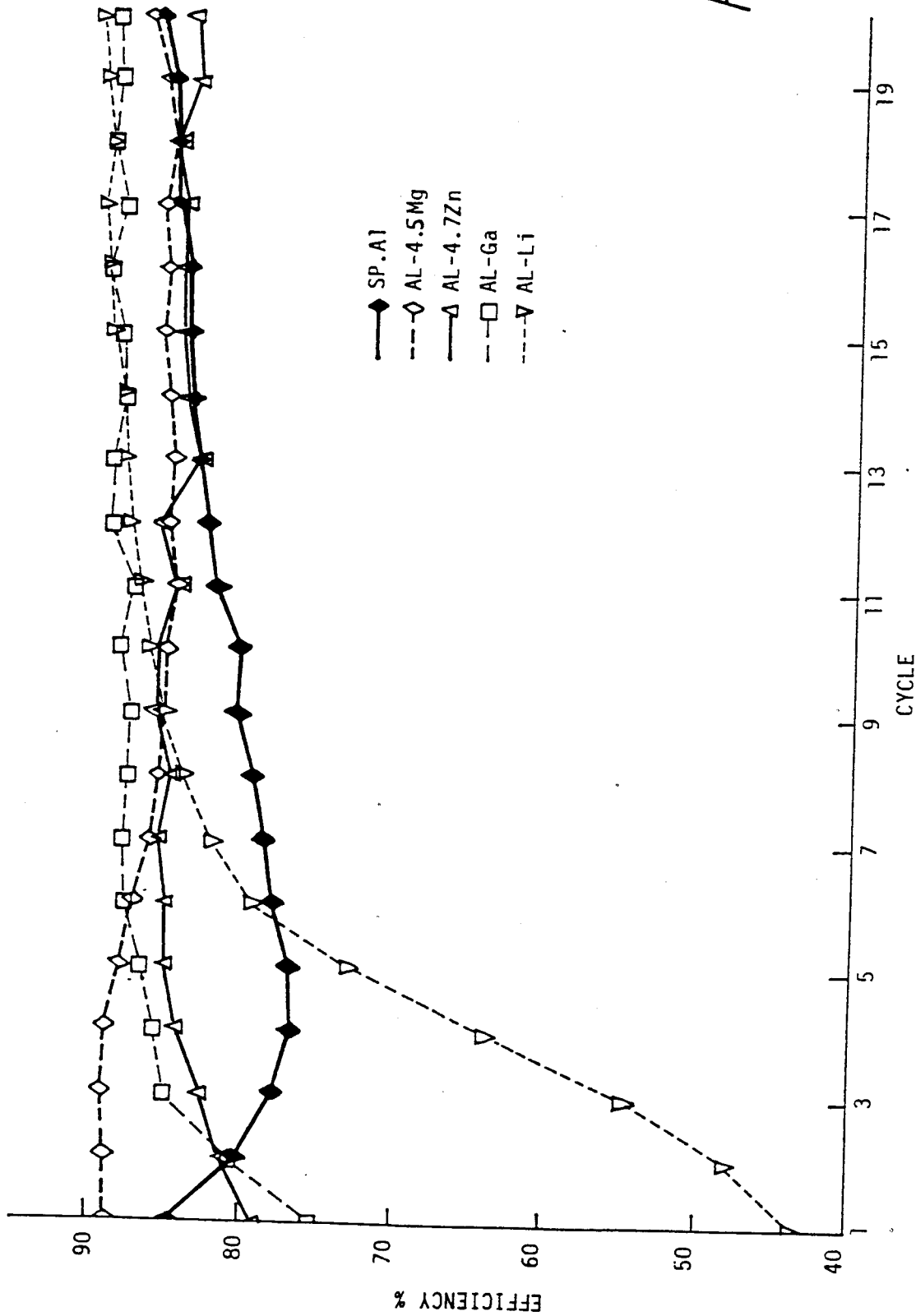
FIG. 3 is a graph of depositing and stripping efficiencies of lithium on several Al-alloys under the conditions specified above for FIG. 1, but with a lithium pre-charge.

The effect of operating conditions may be compensated for by comparing the stripping efficiency of the alloy being tested with that of super pure aluminium tested under similar conditions. In FIG. 3 at the 20th cycle the Al-Mg is 1% better and the Al-Ga 6% better than super pure aluminium. These ratios are likely to be maintained under different operating conditions.

The stripping efficiency required depends on the application and on the cost of the anode. When a battery is to operate for a large number of cycles a small improvement in efficiency results in a significant increase in the battery life. In other applications the cost of the anode may be the significant factor and a lower efficiency can be tolerated.

EXAMPLE 4

Electrodes of super pure Al-Mg alloy and commercial alloys based on commercial purity material of the compositions; 5056 (Al-4.5% Mg) and 5052 (Al-2.5% Mg) were prepared from sheets 0.12 mm thick for the super pure aluminium, 0.130 and 0.230 mm for the 5056 and 0.112 mm for the 5052 commerical alloys. Stripping efficiency of the electrodes was measured as described in example 2 but with a discharge rate of 0.1 ma/cm$^2$.

Figure 4:
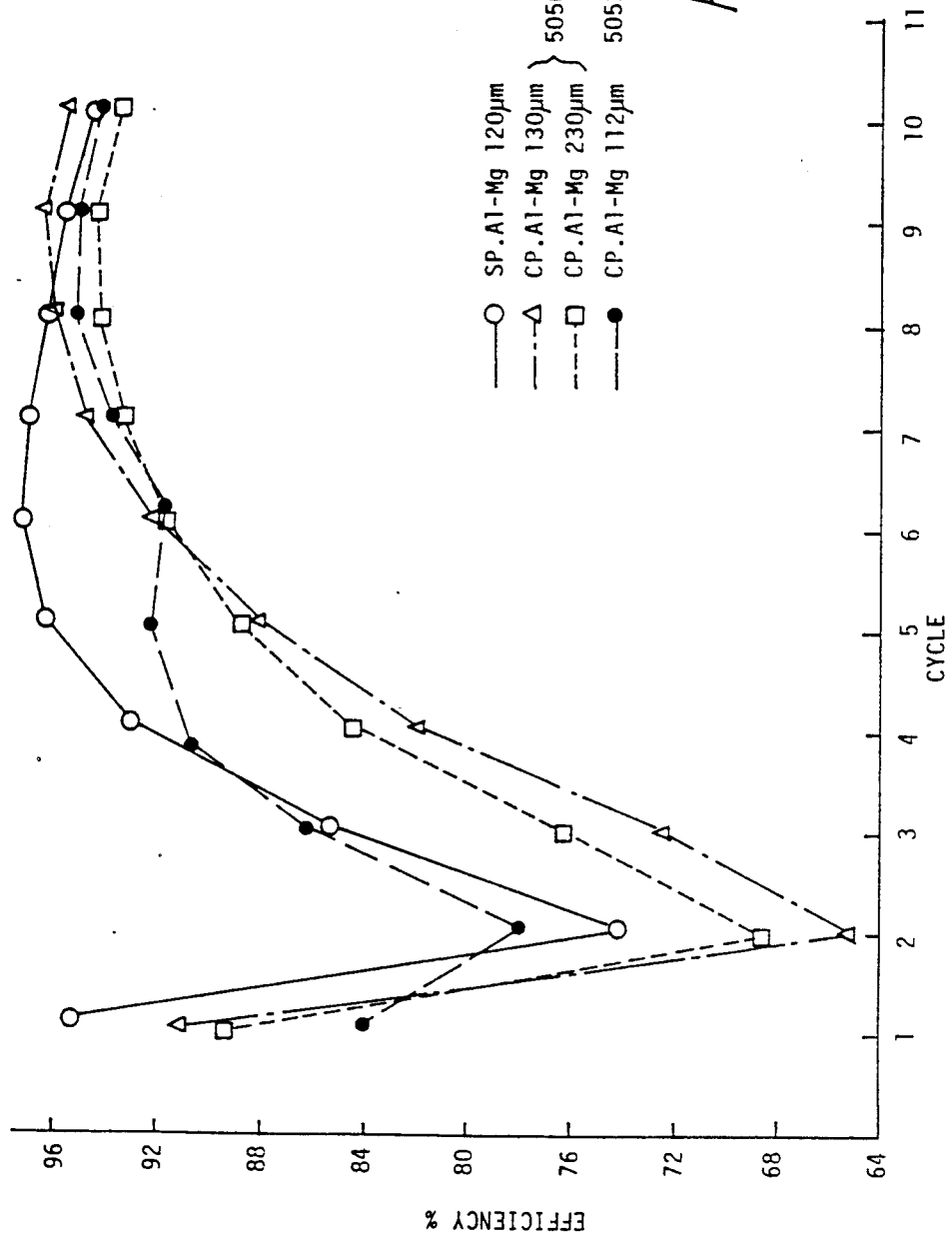
FIG. 4 is a graph of depositing and stripping efficiencies of lithium on certain Al-alloys therein specified.

The results for the stripping efficiencies for the first eleven cycles are shown in FIG. 4 which demonstrates that the behaviour of the commerical purity magnesium containing alloys is similar to that of the super pure alloys particularly after the first seven cycles. The results also indicate that 5056 and 5052 display similar behaviour and with the 5056 there is no noticeable effect of specimen thickness.

EXAMPLE 5

Electrodes were prepared from foils of two commercial purity 8000 series alloys of the type described in GB No. 1,479,429. The alloy compositions were: 8008 containing from 1.52 to 1.67% Fe and from 0.36 to 0.46%

Mn and 8006 containing 1.03 to 1.17% Fe and 0.63 to 0.77% Mn.

Figure 5:
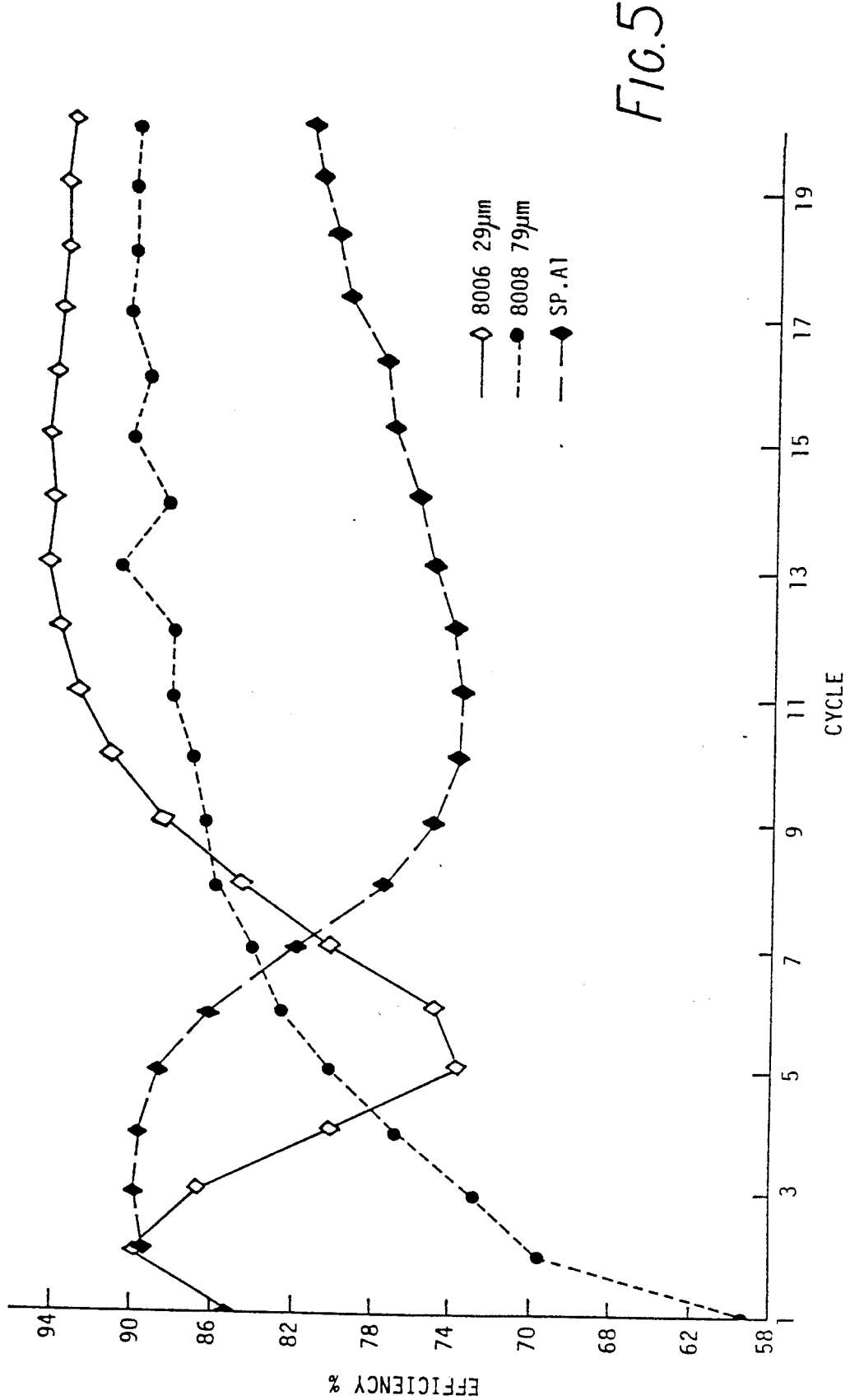
FIG. 5 is a graph of depositing and stripping efficiencies of lithium on certain Al-alloys therein specified, in 1M $LiBF_4$/PC, with deposit/strip at 1 $mA/cm^2$.

Cycling was carried out as described in example 2 and the resulting stripping efficiencies are shown in FIG. 5. The 8008 alloy has a low stripping efficiency for the first few cycles but after seven cycles it exceeds that of super purity aluminium. The 8006 alloy displays a drop of efficiency after the second cycle but this is followed by an increase to a higher level than achieved with the 8008 alloy.

Unlike the other alloys examined, the principal alloying elements in the 8000 series alloys described in GB No. 1,479,429 are predominantly present as fine precipitates dispersed in a fine grain matrix.

EXAMPLE 6

Small electrodes for use in a battery were prepared by conditioning larger sheets in the following way.

A 500 mm × 80 mm × 0.230 mm thick sheet of 5056 alloy (commerical purity Al 4.5% Mg) was bent into a cylindrical shape 150 mm diameter around a 25 mm diameter lithium rod which served as a central cathode. A thin sheet of lithium positioned at the edge of the alloy cylinder served as a reference electrode. The assembly was immersed in an electrolyte of 0.5M $LiBF_4$ in propylene carbonate which was stirred by means of a magnetic stirrer. To exclude water, the equipment was put together and operated in an atmosphere of dry argon.

Lithium was deposited on the sheet by passing current at a current density of 1 $mA/cm^2$ for 1 coulomb/$cm^2$ of charge. The lithium was then removed by discharging the electrode at 0.1 $mA/cm^2$ until the anode potential versus the lithium reference electrode rose to +1 volt. This cycle of charge and discharge was carried out five times.

The alloy sheet was charged at 0.1 $mA/cm^2$ to deposit the equivalent of a coating 18 microns thick on the surface of the electrode. In practice the high diffusion rate of lithium into aluminium alloy allowed most of the deposited metal to move into the sheet.

The sheet was then removed from the electrolyte, washed with propylene carbonate, dried and then uncoiled and cut into electrodes for use in a battery.

EXAMPLE 7

Figure 6:
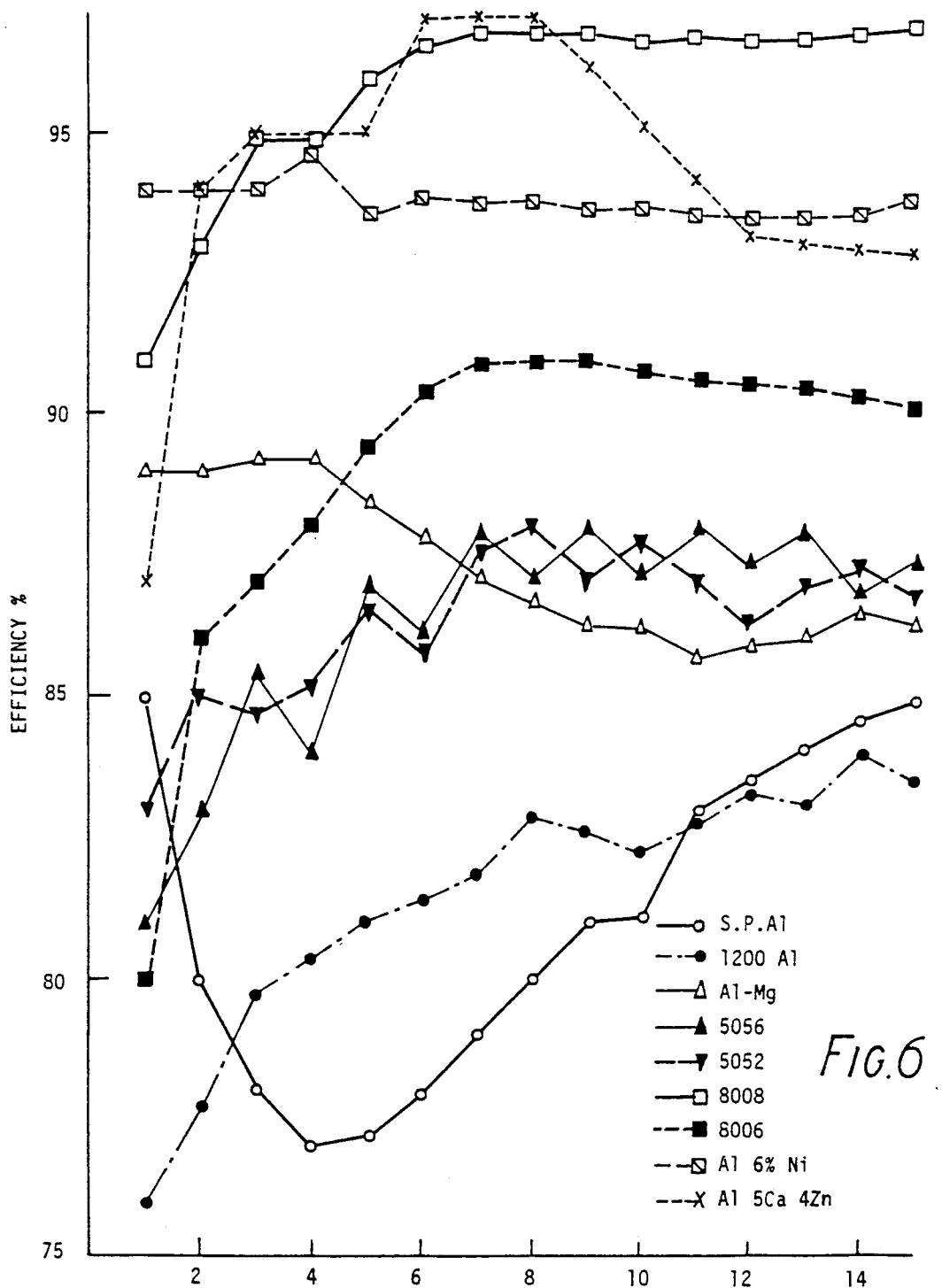
FIG. 6 is a graph of depositing and stripping efficiencies of lithium on certain Al-alloys therein specified, in 1M $LiBF_4$/PC.

FIG. 6 shows the stripping efficiency of various different anodes in the set-up described in Example 2: super-purity aluminium; commercial purity aluminium; three solution type Al alloys, Al-Mg, 5056 and 5052 (of the Alumina Association Inc. Register); and four dispersion-type alloys, 8008, 8006, Al-6% Ni, and Al-5% Ca-4% Zn. All the alloys were subjected to five charge-discharge cycles before testing (expect for the Al-Ca-Zn alloy which was subjected to seven preliminary charge-discharge cycles).

The stripping efficiencies of the four dispersion-type alloys are all greater than 90% and are all significantly better than any of the other materials tested. The solution-type alloys were in turn superior to the two grades of aluminium metal tested.

EXAMPLE 8

A cell was formed comprising a pretreated alloy electrode, an organic electrolyte containing dissolved Li and a Li reference electrode. A potential of 10 mV was applied to the alloy electrode which caused Li to deposit in the alloy at a rate measured by the current passed. The current rose to a peak and then settled at a steady level which was recorded as follows:

| ALLOY | STEADY STATE CURRENT ($mA/cm^2$) |
|---|---|
| Sp.Al | 6.0 |
| 5052 | 6.7 |
| 8006 | 8.4 |
| 8008 | 12.8 |

It is clearly apparent that the dispersion-type alloys 8006 and 8008 incorporate Li at a faster rate than the other two tested. This is an advantage for speed and ease of manufacture.

EXAMPLE 9

The equivalent of 15 microns of lithium was deposited on both sides of 38 microns thick sheets of 8006 alloy and 1200 aluminium in 1M Li $BF_4$/propylene carbonate using a current density of 0.5 $mA/cm^2$. The specimens were given a normal five cycle precharge. After lithiation, the specimens were bent around a 2.3 mm rod. The 1200 alloy sheet cracked very readily on attempting to bend it and would not flex without snapping. However, the 8006 sheet was able to bend adequately around the rod.

Corresponding tests performed on sheets of other commercial purity Al and alloys indicate that the flexibility after lithiation of dispersion-type alloys is better than of the metal or solution-type alloys.

I claim:

1. A lithium battery having a lithium-based anode of aluminium alloy containing 3-25 volume % of dispersed particles with an average size in the range 0.05-2 microns.

2. A battery as claimed in claim 1, wherein the particles contain one or more of Fe, Mn, Ni, Si, Ca, Co and Zn.

3. A battery as claimed in claim 2, wherein the alloy contains Ni alone or two or more of Ni, Fe, Mn, Si and Co in amounts constituting between 20% less and 10% more than the value of a eutectic composition.

4. A battery as claimed in claim 1, wherein the alloy is selected from the 8000 series of the Aluminum Association Register.

5. A battery as claimed in claim 1, wherein the anode has been electrochemically alloyed with Li and pre-treated by being subjected to 3-10 charge-discharge cycles to improve its initial charge-discharge efficiency.

6. A battery as claimed in claim 1 having an organic electrolyte containing dissolved Li.

7. A battery as claimed in claim 1, wherein the battery is rechargeable.

8. A method of preparing anodes for lithium batteries, which method comprises using a sheet of aluminum alloy containing 3-25 volume % of dispersed particles with an average size in the range 0.05-2 microns, electrochemically alloying the sheet with Li, pre-treating the sheet by subjecting it to more than one charge-discharge cycle, and cutting and forming the anodes from the pre-treated sheet.

9. A method as claimed in claim 8, wherein the sheet is subjected to 3-10 charge-discharge cycles.

* * * * *